United States Patent
Yoon (10) Patent No.: US 10,335,943 B2
(45) Date of Patent: Jul. 2, 2019

(54) ROBOT ARM MECHANISM

(71) Applicant: Life Robotics Inc., Tokyo (JP)

(72) Inventor: Woo-Keun Yoon, Tokyo (JP)

(73) Assignee: Life Robotics Inc., Tokyo (JP)

( * ) Notice: Subject to any disclaimer, the term of this patent is extended or adjusted under 35 U.S.C. 154(b) by 236 days.

(21) Appl. No.: 15/493,785

(22) Filed: Apr. 21, 2017

(65) Prior Publication Data

US 2017/0225324 A1   Aug. 10, 2017

Related U.S. Application Data

(63) Continuation of application No. PCT/JP2015/080037, filed on Oct. 23, 2015.

(30) Foreign Application Priority Data

Oct. 24, 2014   (JP) ................................. 2014-217856

(51) Int. Cl.
| | |
|---|---|
| *B25J 9/06* | (2006.01) |
| *B25J 9/04* | (2006.01) |
| *B25J 18/02* | (2006.01) |
| *B25J 18/06* | (2006.01) |

(52) U.S. Cl.
CPC ................. *B25J 9/06* (2013.01); *B25J 9/047* (2013.01); *B25J 18/02* (2013.01); *B25J 18/06* (2013.01); *Y10S 901/15* (2013.01)

(58) Field of Classification Search
CPC ..................................... B25J 9/06; B25J 9/047
See application file for complete search history.

(56) References Cited

U.S. PATENT DOCUMENTS

| | | | |
|---|---|---|---|
| 2009/0060684 A1* | 3/2009 | Nakamoto | ............. B25J 9/0003 414/1 |
| 2012/0024091 A1 | 2/2012 | Kawabuchi et al. | |
| 2013/0068061 A1 | 3/2013 | Yoon | |
| 2018/0065254 A1* | 3/2018 | Okahisa | ................. B25J 9/1676 |
| 2018/0207812 A1* | 7/2018 | Yoon | ........................ B25J 18/02 |
| 2018/0243928 A1* | 8/2018 | Haddadin | ............. B25J 13/085 |
| 2018/0370049 A1* | 12/2018 | Yoon | ........................ B25J 9/047 |

FOREIGN PATENT DOCUMENTS

| | | |
|---|---|---|
| CN | 102257292 A | 11/2011 |
| EP | 2375104 A1 | 10/2011 |
| JP | H02-219377 A | 8/1990 |

(Continued)

OTHER PUBLICATIONS

International Search Report issued in PCT/JP2015/080037, dated Jan. 12, 2016, with translation (6 pages).

(Continued)

*Primary Examiner* — Terence Boes (74) *Attorney, Agent, or Firm* — Nakanishi IP Associates, LLC (57) ABSTRACT

A robot arm mechanism has a plurality of joints. Of the plural joints, a first joint is a rotational joint that rotates on a first axis, a second joint is a rotational joint that rotates on a second axis, and a third joint is a linear motion joint that moves along a third axis. The second axis is perpendicular to the first axis and is a first distance away from the first axis. The third axis is perpendicular to the second axis and is a second distance away from the second axis.

7 Claims, 8 Drawing Sheets

(56) References Cited

FOREIGN PATENT DOCUMENTS

| JP | H04-025385 A | 1/1992 |
| JP | H07-164369 A | 6/1995 |
| WO | 02/064995 A2 | 8/2002 |
| WO | 2011/152265 A1 | 12/2011 |

OTHER PUBLICATIONS

Written Opinion of International Searching Authority issued in PCT/JP2015/080037, dated Jan. 12, 2016 (6 pages).
Realtime Control of Robotic Arm for Persons with Upper-limb Disabilities (RAPUDA), 28th Annual Conference of Robotics Society of Japan Yokoshu, published on Sep. 22, 2010 (2 page).
Notification of Reasons for Refusal issued in Japanese Patent Application No. 2014-217856, dated Jul. 3, 2018, with English Translation (9 pages).
Office Action issued in European Patent Application No. 15852677.2-1018 dated Feb. 6, 2019 (5 Pages).
Office Action issued in Chinese Patent Application No. 201580057860.1 dated Feb. 2, 2019, with English Translation (13 pages).

\* cited by examiner

ROBOT ARM MECHANISM

CROSS-REFERENCE TO RELATED APPLICATIONS

This application is a continuation application of International Patent Application No. PCT/JP2015/080037 filed on Oct. 23, 2015, which is based upon and claims the benefit of priority from the prior Japanese Patent Application No. 2014-217856, filed Oct. 24, 2014, the entire contents of which are incorporated herein by reference.

FIELD

Embodiments described herein relate generally to a robot arm mechanism.

BACKGROUND

Figure 14:
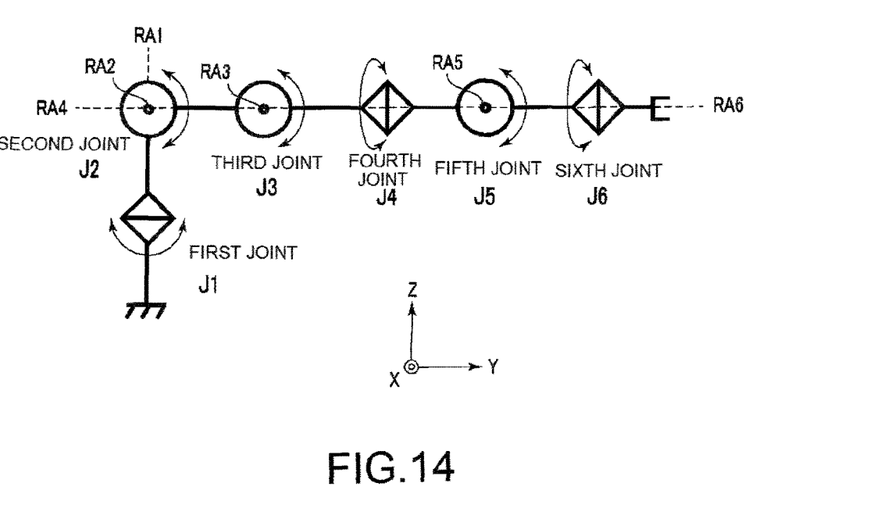
FIG. 14 is a diagram illustrating a conventional typical vertically articulated robot arm mechanism with symbolic representation.

FIG. 14 shows a conventional vertically articulated arm mechanism. The vertically articulated arm mechanism requires three-degree-of-freedom (x, y, z) regarding a position and three-degree-of-freedom (φ, θ, ψ) regarding a posture, which are generally realized by rotational joints J1, J2 and J3 called root three axes and rotational joints J4, J5 and J6 called wrist three axes. For example, a revolute joint is applied to joints J1, J4 and J6, and a bending joint is applied to joints J2, J3 and J5.

Figures 15A, 15B:
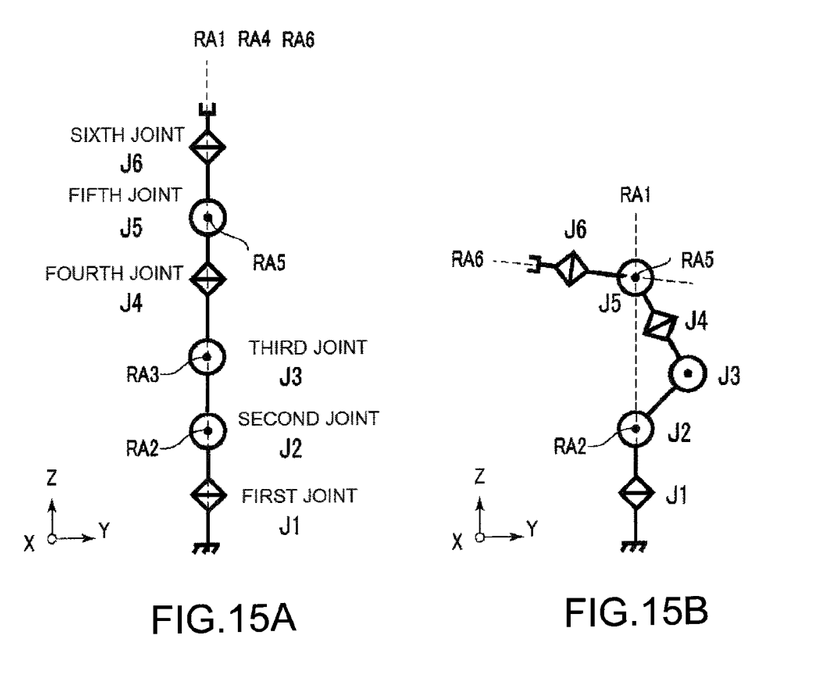
FIGS. 15A, 15B and 15C is a diagram illustrating a conventional typical singular point posture.
Figure 15C:
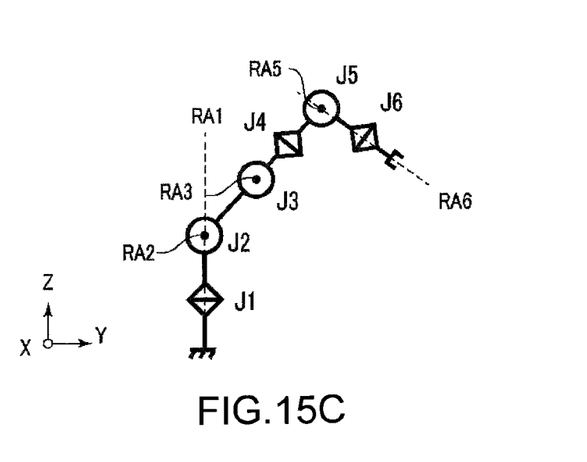

This type of the articulated arm mechanism has countless postures called singular points in which a degree of freedom in a specific direction is lost despite being within a movable range. The singular point posture causes uncontrollable condition due to countless solutions (sets of joint angles satisfying a certain coordinate position) that exist for a coordinate transformation operation of Cartesian coordinates and sets of joint angles, and causes "out-of-control" because an infinite angular velocity is required for the joint and a movement of the joint becomes rapidly fast in the vicinity of the singular point. Thus, in current situation, the problem is handled by avoiding the singular point or sacrificing a hand movement speed. For example, as the singular point, there is a so-called wrist singular point at which axes of rotation RA1, RA4 and RA6 of the revolute joints J1, J4 and J6 are made coaxial by setting all the bending joints J2, J3 and J5 to zero degree as shown in FIG. 15A; and in this situation, it is impossible to uniquely determine rotation angles of these revolute joints J1, J4 and J6. This situation similarly occurs when at least two revolute joints are aligned in the same axis. As other singular point postures, known are a so-called shoulder singular point at which an intersection point of the axes of rotation RA4, RA5 and RA6 of the joints J4, J5 and J6 of the wrist three axes is located on the axis of rotation RA1 of the revolute joint J1 forming an arm base as shown in FIG. 15B, and a so-called elbow singular point at which an intersection point of the axes of rotation RA4, RA5 and RA6 of the joints J4, J5 and J6 of the wrist three axes is located on a plane including axes of rotation RA2 and RA3 of bending joints J2 and J3 of the root three axes as shown in FIG. 15C.

BRIEF DESCRIPTION OF THE INVENTION

The object of the present invention is to provide a robot arm mechanism capable of structurally eliminating or reducing singular point postures within a movable range.

The robot arm mechanism according to the present embodiment has a plurality of joints. Of the joints, a first joint is a rotational joint that rotates on a first axis, a second joint is a rotational joint that rotates on a second axis, and a third joint is a linear motion joint that moves along a third axis. The second axis is perpendicular to the first axis and is a first distance away from the first axis. The third axis is perpendicular to the second axis and is a second distance away from the second axis.

DETAILED DESCRIPTION OF THE INVENTION

Hereinafter, a robot arm mechanism according to the present embodiment is described with reference to the accompanying drawings. In the following description, the same reference numerals denote components having substantially identical functions and structures, and the repeated description thereof is made only when necessary.

Figure 1:
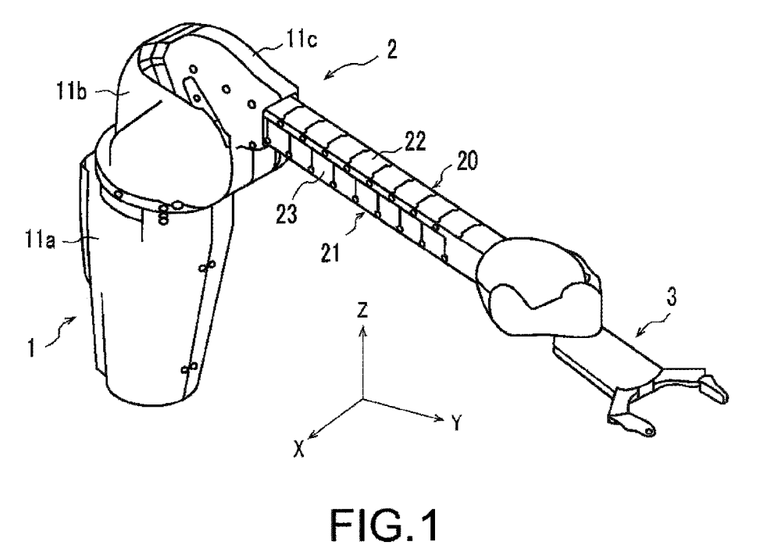
FIG. 1 is an external perspective view of a robot arm mechanism according to the present embodiment.
Figure 2:
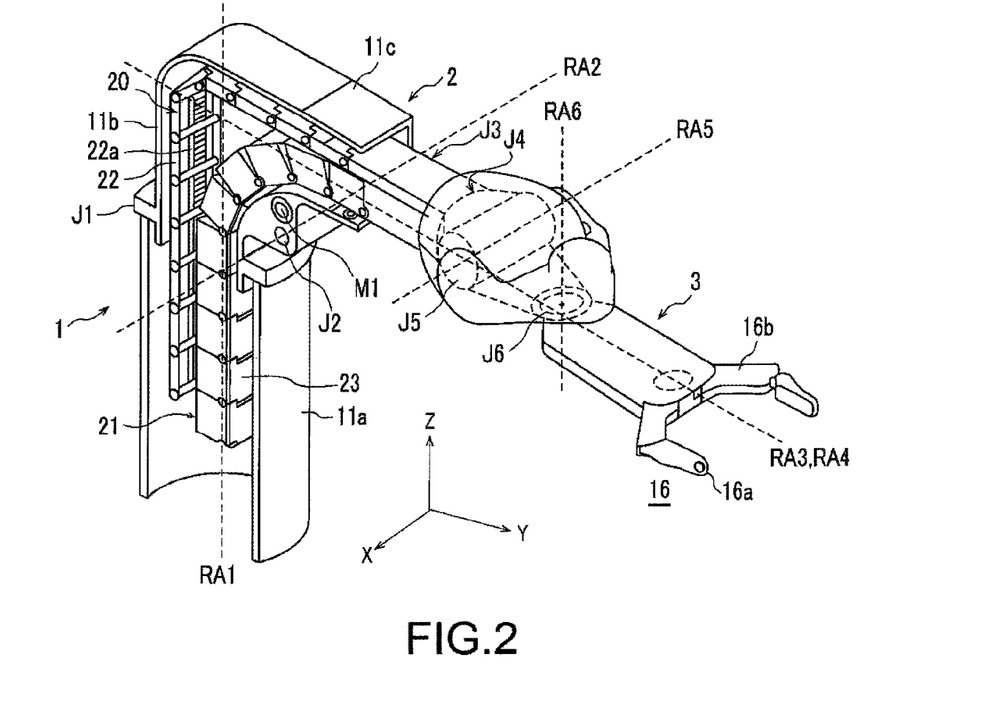
FIG. 2 is a perspective view illustrating an internal structure of the robot arm mechanism in FIG. 1.
Figure 3:
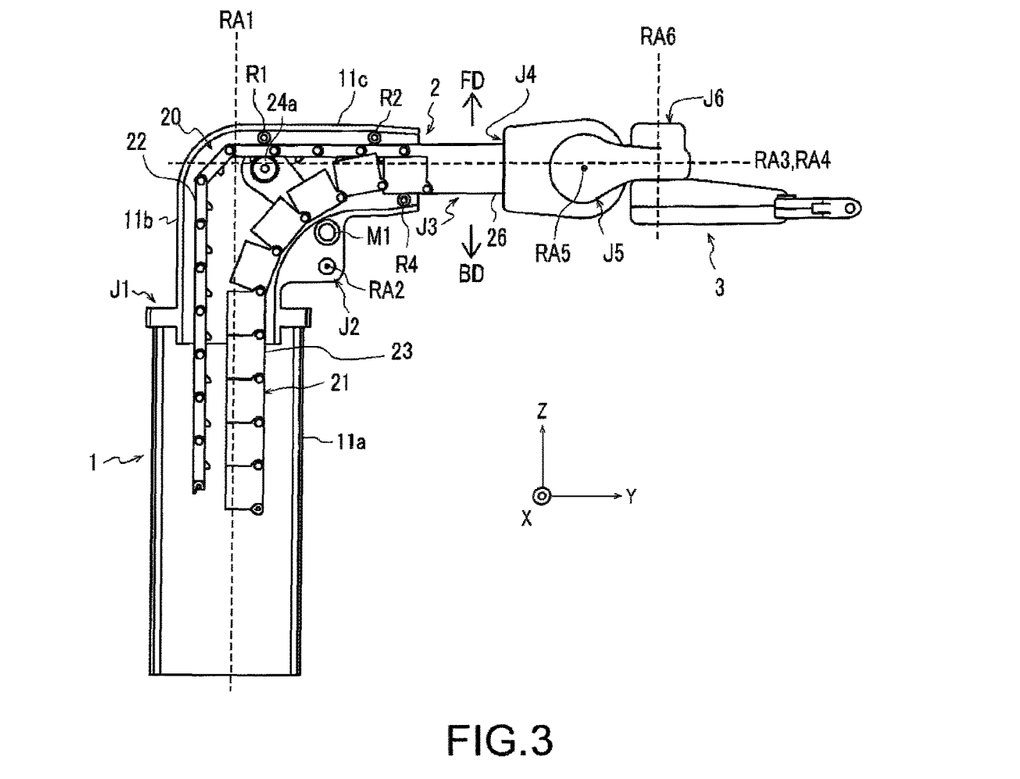
FIG. 3 is a view illustrating the internal structure of the robot arm mechanism in FIG. 1 viewed from a cross section direction.
Figure 4:
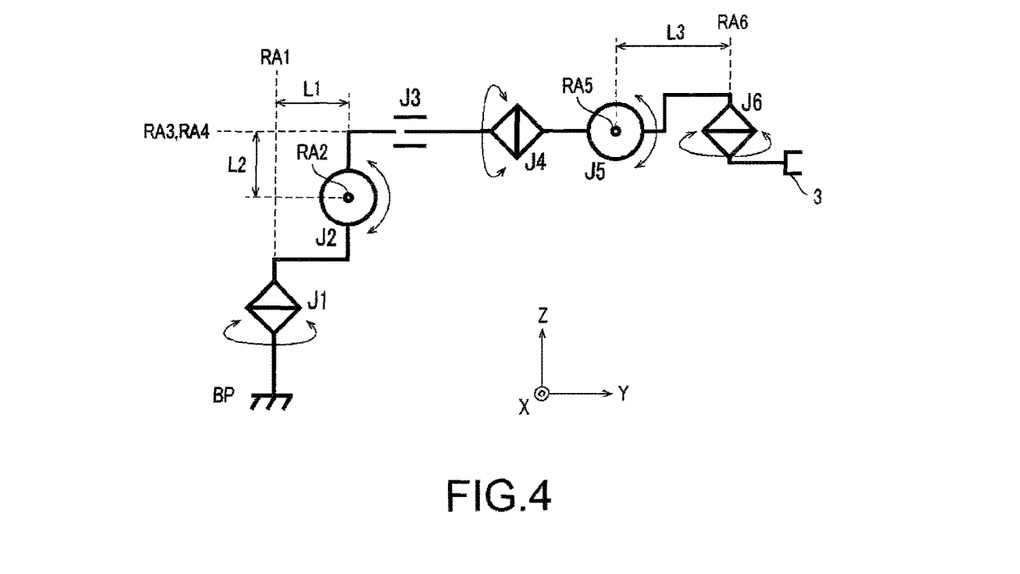
FIG. 4 is a diagram illustrating the robot arm mechanism in FIG. 1 with symbolic representation.

FIG. 1 is an external perspective view of the robot arm mechanism according to the present embodiment. FIG. 2 and FIG. 3 are diagrams illustrating an internal structure of the robot arm mechanism in FIG. 1. FIG. 4 is a diagram illustrating the robot arm mechanism in FIG. 1 with symbolic representation. The robot arm mechanism includes a substantially cylindrical base 1 and an arm section 2 connected to the base 1. A hand end-effector 3 called an end effector is attached to a tip of the robot arm section 2. In FIG. 1, a hand section capable of holding an object is shown as the hand end-effector 3. The hand end-effector 3 is not limited to the hand section, but may be another tool, a camera, or a display. At the tip of the robot arm section 2, an adapter which can be replaced by any type of the hand end-effector 3 may be provided.

The robot arm section 2 includes a plurality (herein, six) of joints J1, J2, J3, J4, J5 and J6. The plurality of the joints J1, J2, J3, J4, J5 and J6 are arranged in order from the base 1. Generally, a first axis RA1, a second axis RA2 and a third axis RA3 are called root three axes, and a fourth axis RA4, a fifth axis RA5 and a sixth axis RA6 are called wrist three axes which change the posture of the hand section 3. At least one of the joints J1, J2 and J3 constituting root three axes is a linear motion joint. Herein, the third joint J3 is the linear motion joint, particularly a joint with a relatively long extension distance. The first joint J1 is a revolute joint that rotates on the first axis of rotation RA1 which is held, for example, perpendicularly to a base surface. The second joint J2 is a bending joint that rotates on the second axis of rotation RA2 perpendicular to the first axis of rotation RA1. The third joint J3 linearly extends or contracts along the third axis (axis of movement) RA3 perpendicular to the second axis of rotation RA2. The fourth joint J4 is a revolute joint that rotates on the fourth axis of rotation RA4 which matches the third axis of movement RA3. The fifth joint J5 is a bending joint that rotates on the fifth axis of rotation RA5 orthogonal to the fourth axis of rotation RA4. The sixth joint J6 is a bending joint that rotates on the sixth axis of rotation RA6 orthogonal to the fourth axis of rotation RA4 and perpendicular to the fifth axis of rotation RA5.

The arm section 2 turns together with the hand section 3 in accordance with rotation of the first joint J1. The arm section 2 rotates on the second axis of rotation RA2 of the second joint J2 together with the hand section 3 in accordance with rotation of the second joint J2. An arm support body (first support body) 11a forming the base 1 has a cylindrical hollow structure formed around the axis of rotation RA1 of the first joint J1. The first joint J1 is mounted on a fixed base (not shown). When the first joint J1 rotates, the first support body 11a axially rotates together with the turn of the arm section 2. The first support body 11a may be fixed on a ground plane. In this case, the arm section 2 turns independently of the first support body 11a. A second support body 11b is connected to an upper part of the first support body 11a.

The second support body 11b has a hollow structure continuous to the first support body 11a. One end of the second support body 11b is attached to a rotating section of the first joint J1. The other end of the second support body 11b is open, and a third support body 11c is set rotatably on the axis of rotation RA2 of the second joint J2. The third support body 11c has a scaly hollow structure communicating with the first support body 11a and the second support body 11b. In accordance with the bending rotation of the second joint J2, a rear part of the third support body 11c is accommodated in or sent out from the second support body 11b. The rear part of the third joint J3 which constitutes a linear motion joint of the arm section 2 is housed inside the continuous hollow structure of the first support body 11a and the second support body 11b by contraction thereof.

The first joint J1 includes an annular fixed section and a rotating section and is fixed to a base at the fixed section. The first support body 11a and the second support body 11b are attached to the rotating section. When the first joint J1 rotates, the first support body 11a, the second support body 11b and the third support body 11c turn around the first axis of rotation RA1 together with the arm section 2 and the hand section 3.

The third support body 11c is set rotatably, at the lower part of its rear end, on the axis of rotation RA2 with respect to a lower side of an open end of the second support body 11b. In this way, the second joint J2 serving as the bending joint that rotates on the axis of rotation RA2, is formed. When the second joint J2 rotates, the arm section 2 rotates vertically (in other words, undulates) on the axis of rotation RA2 of the second joint J2 together with the hand section 3. The axis of rotation RA2 of the second joint J2 is perpendicular to the first axis of rotation RA1 of the first joint J1 serving as a revolute joint.

As described above, the third joint J3 serving as a joint section constitutes a main constituent of the arm section 2. The hand section 3 described above is provided at the tip of the arm section 2. Rotation, bending and extension and contraction of the first to sixth joints J1-J6 enable positioning two-fingered hand 16 of the hand section 3 at any position and posture. In particular, the linear extension and contraction distance of the third joint J3 enables the hand section 3 to act on an object in a wide range from a position close to the base 1 to a position far from the base 1.

The third joint J3 is characterized by the linear extension and contraction distance realized by a linear extension and contraction arm mechanism constituting the third joint J3. The linear extension and contraction distance is achieved by the structure shown in FIG. 2 and FIG. 3. The linear extension and contraction arm mechanism includes a first connection piece column 21 and a second connection piece column 20. In an alignment pose where the arm section 2 is horizontally positioned, the first connection piece column 21 is located below the second connection piece column 20, and the second connection piece column 20 is located on the top of the first connection piece column 21.

The first connection piece column 21 includes a plurality of first connection pieces 23 having the same U-shaped cross section and connected in a column by pins at their back surface parts. The first connection piece column 21 is bendable in its back surface direction BD but, conversely, not bendable in its front surface direction FD due to the shape of the cross section of the first connection piece 23 and connection positions by the pins. The second connection piece column 20 has a substantially flat plate shape with a width substantially equivalent to that of the first connection piece 23, and includes a plurality of second connection pieces 22 connected in a column by pins in a bendable state in both the back surface direction and the front surface direction. The first connection piece column 21 is joined to the second connection piece column 20 at the tip part by a joining piece 26. The joining piece 26 has an integrated shape of the first connection piece 23 and the second connection piece 22. When the second connection piece column 20 is sent out from the third support body 11c together with the first connection piece column 21 starting with the joining piece 26, the first connection piece column 21 and the second connection piece column 20 are jointed to each other. The first connection piece column 21 and the second connection piece column 20 are joined at their tip parts by the joining piece 26, and are each held in a jointed state at their rear part by being firmly held inside the third support body 11c and prevented from being pulled out. When the first connection piece column 21 and the second connection piece column 20 are held in the jointed state, the bending of the first connection piece column 21 and the second connection piece column 20 is restricted, whereby the first connection piece column 21 and the second connection piece column 20 constitute a columnar body having a certain stiffness. When the first connection piece column 21 and the second connection piece column 20 are separated from each other, the bending restriction is canceled, and the bendable state thereof is restored. The first connection piece column 21 and the second connection piece column 20 are joined in the vicinity of the opening of the third support body 11c and are sent out. The first connection piece column 21 and the second connection piece column 20 are separated from each other in the third support body 11c, and each become bendable. The first connection piece column 21 and the second connection piece column 20 are bent individually and accommodated in the first support body 11a as separate bodies.

As shown in FIG. 2, a linear gear 22a is formed on the inside of each of the second connection pieces 22. The linear gears 22a are connected to form a continuous linear gear when the second connection piece column 20 has a linear shape. As shown in FIG. 3, the second connection piece 22 is sandwiched between a roller R1 and a drive gear 24a inside the third support body 11c. The linear gear 22a is engaged with the drive gear 24a. The second connection piece column 20 is sent out from the third support body 11c together with the first connection piece column 21 by forward rotation of the drive gear 24a by a motor M1. At that time, the first connection piece column 21 and the second connection piece column 20 are sandwiched between a pair of an upper roller R2 and a lower roller R4 provided in the vicinity of the opening of the third support body 11c, are pressed against each other, and are linearly sent out in a joined state along the third axis of movement RA3. The reverse rotation of the drive gear 24a by a motor M1 causes cancellation of the joined state of the second connection piece column 20 and the first connection piece column 21 and separation thereof in the third support body 11c behind the upper roller R2 and the lower roller R4. The separated second connection piece column 20 and first connection piece column 21 restore their bendable state, and are guided by guide rails provided inside the second support body 11b and the third support body 11c to be bent in a direction along the first axis of rotation RA1 and housed inside the first support body 11a.

The hand section 3 is provided at the tip of the arm section 2 as shown in FIG. 1. The hand section 3 is moved to a given position by the first joint J1, the second joint J2 and the third joint J3, and is positioned to take a given posture by the fourth joint J4, the fifth joint J5 and the sixth joint J6. The hand section 3 has two fingers 16a and 16b configured to be opened and closed. The fourth joint J4 is a revolute joint having the axis of rotation RA4 which typically matches a center axis of the arm section 2 along the extension and retraction direction of the arm section 2, that is, the axis of movement RA3 of the third joint J3. When the fourth joint J4 rotates, the hand section 3 rotates on the axis of rotation RA4 from the fourth joint J4 to the tip thereof.

The fifth joint J5 is a bending joint having the axis of rotation RA5 orthogonal to the axis of rotation RA4 of the fourth joint J4. When the fifth joint rotates, the hand section 3 rotates up and down. The sixth joint J6 is a revolute joint having the axis of rotation RA6 orthogonal to the axis of rotation RA4 of the fourth joint J4 and perpendicular to the axis of rotation RA5 of the fifth joint J5. When the sixth joint J6 rotates, the hand 16 turns left and right.

FIG. 4 is a diagram illustrating the robot arm mechanism in FIG. 1 with symbolic representation. The robot arm mechanism realizes three-degree-of-freedom of position and three-degree-of-freedom of posture by the first joint J1, the second joint J2 and the third joint J3 which constitute the root three axes, and the fourth joint J4, the fifth joint J5 and the sixth joint J6 which constitute the wrist three axes. The first joint J1 is arranged between the first support body 11a and the second support body 11b and is formed as a revolute joint that rotates on the axis of rotation RA1. The axis of rotation RA1 is perpendicular to a base plane BP of the base on which the fixed section of the first joint J1 is installed. Z axis is defined to be parallel to the axis of rotation RA1. For convenience of description, a rotational coordinate system (XYZ) that rotates together with the rotation of the first joint J1 which rotates on the Z axis is defined.

The second joint J2 is formed as a bending joint that rotates on the axis of rotation RA2. The axis of rotation RA2 of the second joint J2 is parallel to the X axis in the rotational coordinate system. The axis of rotation RA2 of the second joint J2 is perpendicular to the axis of rotation RA1 of the first joint J1. Furthermore, the axis of rotation RA2 of the second joint J2 is away from the axis of rotation RA1 of the first joint J1 in the Y axis direction. In other words, the axis of rotation RA2 of the second joint J2 is away from the axis of rotation RA1 of the first joint J1 in a direction orthogonal to the axis of rotation RA1 of the first joint J1 and the axis of rotation RA2 of the second joint J2. In that direction, the axis of rotation RA2 of the second joint J2 is a predetermined distance (offset distance) L1 away from the axis of rotation RA1 of the first joint J1. Thus, the second joint J2 is arranged in a state in which the axis of rotation RA2 thereof does not intersect with the axis of rotation RA1 of the first joint J1 (offset). The second support body 11b and the first support body 11a are configured in such a manner that the axis of rotation RA2 of the second joint J2 is offset with respect to the axis of rotation RA1 of the first joint J1 by an offset distance L1 in the above-described direction. A virtual arm rod section (link part) for connecting the second joint J2 to the first joint J1 has a crank shape formed by combining two hook shaped bodies with tips bent into right angles. The virtual arm rod section is formed by the first support body 11a and the second support body 11b each of which includes a hollow structure.

Structurally arranging the second joint J2 with respect to the first joint J1 in such a manner that the axis of rotation RA2 of the second joint J2 is offset with respect to the axis of rotation RA1 of the first joint J1 as described above includes not only arranging a structural center of the second joint J2 to be offset with respect to a structural center of the first joint J1 in the Y axis direction by the offset distance L1, but also arranging the structural center of the second joint J2 to be offset also in the X axis direction, that is, the axis of rotation RA2 of the second joint J2, by a given distance.

The third joint J3 is formed as a linear motion joint that moves along the axis of movement RA3. The axis of movement RA3 of the third joint J3 is perpendicular to the axis of rotation RA2 of the second joint J2. In the alignment pose in which the rotation angle of the second joint J2 is zero degree, in other words, the luffing angle of the arm section 2 is zero degree, and the arm section 2 is horizontal, the axis of movement RA3 of the third joint J3 is perpendicular to both the axis of rotation RA1 of the first joint J1 and the axis of rotation RA2 of the second joint J2. In the rotational coordinate system, the axis of movement RA3 of the third joint J3 is parallel to the Y axis which is perpendicular to the X axis and the Z axis. Furthermore, the axis of movement RA3 of the third joint J3 is away from the axis of rotation RA2 of the second joint J2 in a direction orthogonal to the axis of rotation RA2 and the axis of movement RA3. The distance (offset distance) between the axis of movement RA3 of the third joint J3 and the axis of rotation RA2 of the second joint J2 is L2. The axis of movement RA3 does not intersect with the axis of rotation RA2 (offset).

In this way, the axis of movement RA3 of the third joint J3 is provided perpendicular to the axis of rotation RA2 of the second joint J2 and an offset distance L2 away from the axis of rotation RA2 of the second joint J2, and the third joint J3 is structurally arranged with respect to the second joint J2 in such a manner that the axis of movement RA3 of the third joint J3 is positioned with respect to the axis of rotation RA2 of the second joint J2 in the above-described way. The virtual arm rod section (link part) that connects the third joint J3 to the second joint J2 has a hook-shaped body whose tip is vertically bent. The virtual arm rod section includes the second support body 11b and the third support body 11c.

Structurally arranging the third joint J3 with respect to the second joint J2 in such a manner that the axis of movement RA3 of the third joint J3 is offset with respect to the axis of rotation RA2 of the second joint J2 as described above includes not only arranging a center line (axis of movement RA3) of the third joint J3 to be offset with respect to the structural center of the second joint J2 only by the offset distance L2, but also arranging the center line of the third joint J3 to be offset also in the X axis direction, that is, the axis of rotation RA2 of the second joint J2, by a given distance.

The fourth joint J4 is formed as a revolute joint that rotates on the axis of rotation RA4. The axis of rotation RA4 of the fourth joint J4 substantially matches the axis of movement RA3 of the third joint J3. The fifth joint J5 is formed as a bending joint that rotates on the axis of rotation RA5. The axis of rotation RA5 of the fifth joint J5 is substantially orthogonal to the axis of movement RA3 of the third joint J3 and the axis of rotation RA4 of the fourth joint J4. The sixth joint J6 is formed as a revolute joint that rotates on the axis of rotation RA6. The axis of rotation RA6 of the sixth joint J6 is substantially orthogonal to the axis of rotation RA4 of the fourth joint J4 and the axis of rotation RA5 of the fifth joint J5. The sixth joint J6 is provided to turn the hand section 3 serving as a hand end-effector and may be installed as a bending joint of which axis of rotation RA6 is substantially orthogonal to the axis of rotation RA4 of the fourth joint J4 and the axis of rotation RA5 of the fifth joint J5.

Figure 5A:
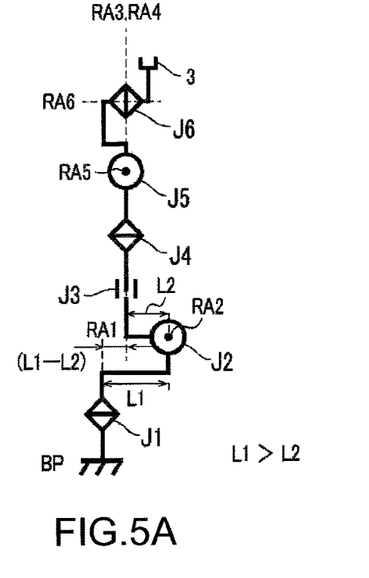
FIGS. 5A and 5B are a diagram illustrating an example of offset distances L1 and L2 in FIG. 4.
Figure 5B:
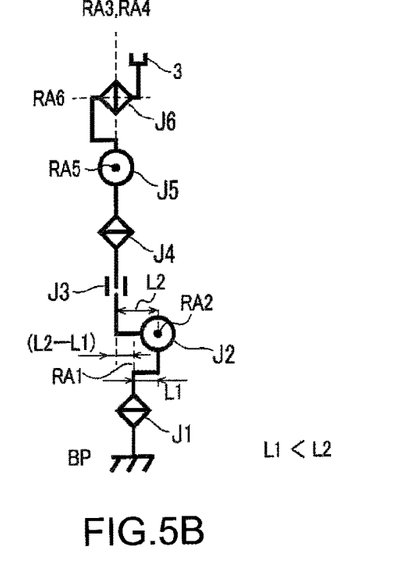

As shown in FIGS. 5A, 5B, the offset distance L1 of the axis of rotation RA2 of the second joint J2 with respect to the axis of rotation RA1 of the first joint J1 is different from the offset distance L2 of the axis of movement RA3 of the third joint J3 with respect to the axis of rotation RA2 of the second joint J2. As shown in FIG. 5A, the offset distance L1 of the axis of rotation RA2 of the second joint J2 with respect to the axis of rotation RA1 of the first joint J1 is set to be longer than the offset distance L2 of the axis of movement RA3 of the third joint J3 with respect to the axis of rotation RA2 of the second joint J2. As shown in FIG. 5B, the offset distance L1 of the axis of rotation RA2 of the second joint J2 with respect to the axis of rotation RA1 of the first joint J1 is set to be shorter than the offset distance L2 of the axis of movement RA3 of the third joint J3 with respect to the axis of rotation RA2 of the second joint J2.

Figure 6A:
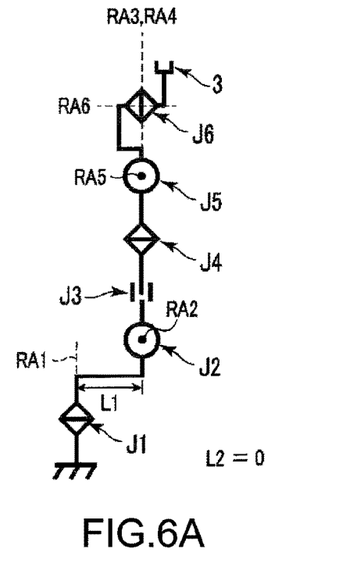
FIGS. 6A and 6B are a diagram illustrating another example of the offset distances L1 and L2 in FIG. 4.
Figure 6B:
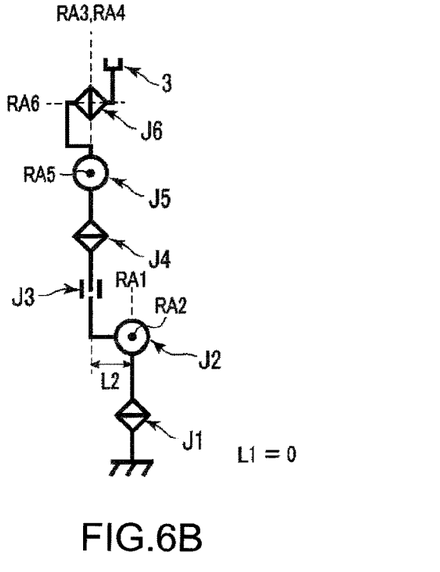

As shown in FIG. 6A, the offset distance L1 of the axis of rotation RA2 of the second joint J2 with respect to the axis of rotation RA1 of the first joint J1 may be maintained at a predetermined value, and the offset distance L2 of the axis of movement RA3 of the third joint J3 with respect to the axis of rotation RA2 of the second joint J2 may be set to zero. In other words, the axis of movement RA3 of the third joint J3 may be orthogonal to the axis of rotation RA2 of the second joint J2 by offsetting the axis of rotation RA2 of the second joint J2 with respect to the axis of rotation RA1 of the first joint J1 and not offsetting the axis of movement RA3 of the third joint J3 with respect to the axis of rotation RA2 of the second joint J2. As shown in FIG. 6B, the offset distance L2 of the axis of movement RA3 of the third joint J3 with respect to the axis of rotation RA2 of the second joint J2 may be maintained at a predetermined value, and the offset distance L1 of the axis of rotation RA2 of the second joint J2 with respect to the axis of rotation RA1 of the first joint J1 may be set to zero. In other words, the axis of movement RA2 of the second joint J2 may be orthogonal to the axis of rotation RA1 of the first joint J1 by offsetting the axis of movement RA3 of the third joint J3 with respect to the axis of rotation RA2 of the second joint J2 and not offsetting the axis of rotation RA2 of the second joint J2 with respect to the axis of rotation RA1 of the first joint J1.

Figure 13A:
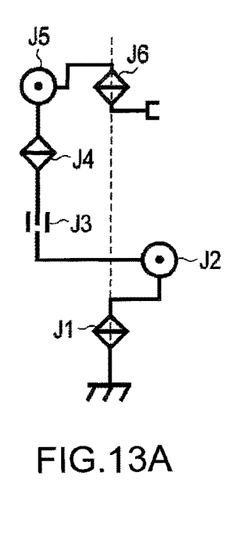
FIGS. 13A, 13B and 13C are a diagram illustrating a singular point posture eliminated by the present embodiment.
Figure 13B:
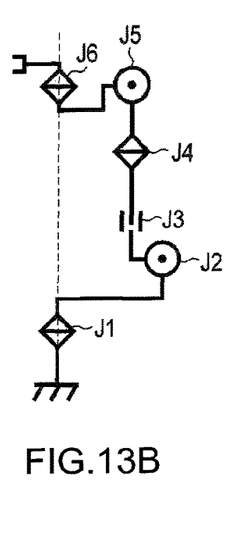

In the present embodiment, at least one bending joint of the plurality of joints J1-J6, specifically, root three axes is replaced with a linear motion joint, as shown in FIGS. 5A, 5B, the axis of rotation RA2 of the second joint J2 is separated from the axis of rotation RA1 of the first joint J1 only by offset distance L1, and the axis of movement RA3 of the third joint J3 is separated from the axis of rotation RA2 of the second joint J2 only by offset distance L2 different from offset distance L1. In the present embodiment, as shown in FIGS. 6a,6B, either one of offset distance L1 and offset distance L2 is set to zero, and the axis of rotation RA2 is separated from the axis of rotation RA1 or the axis of movement RA3 is separated from the axis of rotation RA2. Thereby as shown in FIGS. 5A,5B and FIGS. 6A, 6B, even if bending joints J2 and J5 are rotated to maximally extend the arm section 2, as the arrangement in which the axis of rotation RA1 of a revolute joint J1 is deviated from the axis of rotation RA4 of the other revolute joint J4 by a difference between offset distance L1 and offset distance L2 is realized. As shown in FIGS. 13A and 13B, it is possible to structurally eliminate the singular point posture without aligning the axis of rotation RA1 of the revolute joint J1 and the axis of rotation RA4 of the revolute joint J4 in a straight line.

Figure 7:
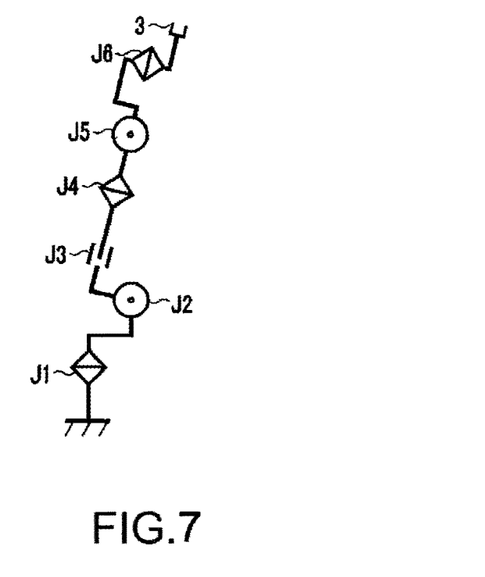
FIG. 7 is a diagram illustrating a case in which a specific posture is prevented from being a singular point posture by the present embodiment.

Furthermore, the posture in which the axes of rotation RA2 and RA5 of bending joints J2 and J5 are aligned in the straight line in a vertical direction as shown in FIG. 7 may appear to be a singular point posture; however, in the present embodiment, as the alignment can be avoided by the extension and contraction of the third joint J3 by setting the third joint J3 as a linear motion joint, it should be easy to understand that the above posture is not a singular point posture, and a singular point posture can be effectively structurally eliminated.

Figure 8A:
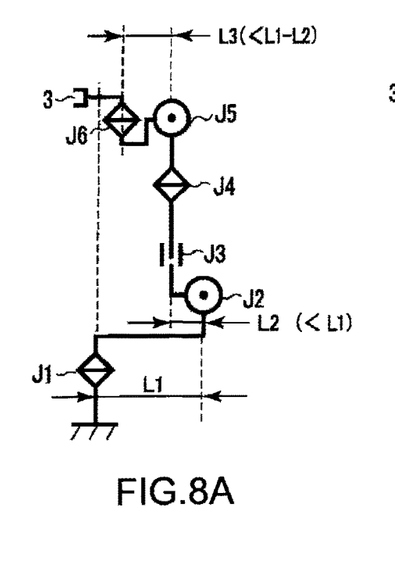
FIGS. 8A and 8B are a diagram illustrating an example of offset distances L1, L2 and L3 in FIG. 4.
Figure 8B:
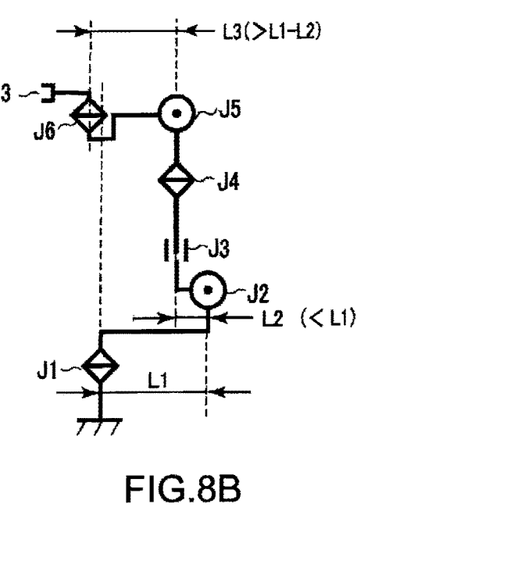

Furthermore, in the present embodiment, as shown in FIGS. 8A and 8B, when the offset distance L1 of the axis of rotation RA2 of the second joint J2 with respect to the axis of rotation RA1 of the first joint J1 is set to be longer than the offset distance L2 of the axis of rotation RA2 of the second joint J2 with respect to the axis of rotation RA1 of the first joint J1, the fifth joint J5 and the sixth joint J6 are arranged in such a manner that a distance L3 between the axis of rotation RA5 of the fifth joint J5 and the axis of rotation RA6 of the sixth joint J6 is different from a difference (L1−L2) between offset distance L1 and offset distance L2. As shown in FIG. 8A, the distance L3 between the axis of rotation RA5 of the fifth joint J5 and the axis of rotation RA6 of the sixth joint J6 is set to be shorter than the difference (L1−L2) between offset distance L1 and offset distance L2, or as shown in FIG. 8B, the distance L3 between the axis of rotation RA5 of the fifth joint J5 and the axis of rotation RA6 of the sixth joint J6 is set to be longer than the difference (L1−L2) between offset distance L1 and offset distance L2.

Figure 9A:
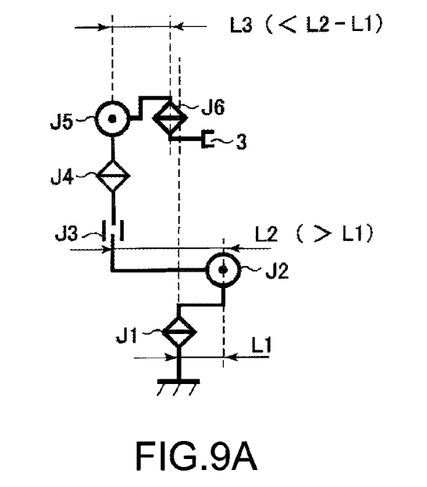
FIGS. 9A and 9B are a diagram illustrating another example of the offset distances L1, L2 and L3 in FIGS. 8A and 8B.
Figure 9B:
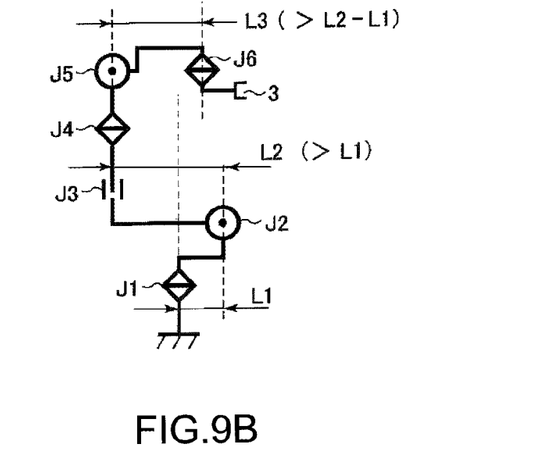

Similarly, as shown in FIGS. 9A, 9B, when the offset distance L1 of the axis of rotation RA2 of the second joint J2 with respect to the axis of rotation RA1 of the first joint J1 is set to be shorter than the offset distance L2 of the axis of rotation RA2 of the second joint J2 with respect to the axis of rotation RA1 of the first joint J1, the fifth joint J5 and the sixth joint J6 are arranged in such a manner that the distance L3 between the axis of rotation RA5 of the fifth joint J5 and the axis of rotation RA6 of the sixth joint J6 is different from a difference (L2−L1) between offset distance L1 and offset distance L2. As shown in FIG. 9A, the distance L3 between the axis of rotation RA5 of the fifth joint J5 and the axis of rotation RA6 of the sixth joint J6 is set to be shorter than the difference (L2−L1) between offset distance L1 and offset distance L2, or as shown in FIG. 9B, the distance L3 between the axis of rotation RA5 of the fifth joint J5 and the axis of rotation RA6 of the sixth joint J6 is set to be longer than the difference (L2−L1) between offset distance L1 and offset distance L2.

When the distance L3 between the axis of rotation RA5 and the axis of rotation RA6 is substantially equal to the difference between the offset distance L1 and the offset distance L2, as shown in FIG. 13A, in a case in which bending joint J2 is rotated by 90 degrees, and bending joint J5 is rotated by 90 degrees in a reverse direction from the alignment pose, or as shown in FIG. 13B, bending joint J2 is rotated by 90 degrees, and bending joint J5 is rotated by 90 degrees in the same direction from the alignment pose, a singular point posture in which the axis of rotation RA1 of revolute joint J1 and the axis of rotation RA6 of revolute joint J6 are aligned in the straight line is generated. However, as shown in FIGS. 8A, 8B and FIGS. 9A, 9B, by arranging the fifth joint J5 and the sixth joint J6 in such a manner that the distance L3 between the axis of rotation RA5 and the axis of rotation RA6 is different from the difference between offset distance L1 and offset distance L2, as shown in FIG. 8A and FIG. 9A, the axis of rotation RA1 of revolute joint J1 and the axis of rotation RA6 of revolute joint J6 can be offset only by a distance obtained by subtracting the distance L3 between the axis of rotation RA5 and the axis of rotation RA6 from the difference between offset distance L1 and offset distance L2, and it is possible to structurally eliminate the singular point posture in which the axis of rotation RA1 of revolute joint J1 and the axis of rotation RA6 of revolute joint J6 are aligned in a straight line. Similarly, as shown in FIG. 8B and FIG. 9B, the axis of rotation RA1 of revolute joint J1 and the axis of rotation RA6 of revolute joint J6 can be offset only by a distance obtained by subtracting the difference between offset distance L1 and offset distance L2 from the distance L3 between the axis of rotation RA5 and the axis of rotation RA6, and it is possible to structurally eliminate the singular point posture in which the axis of rotation RA1 of revolute joint J1 and the axis of rotation RA6 of revolute joint J6 are aligned in a straight line.

Figure 10:
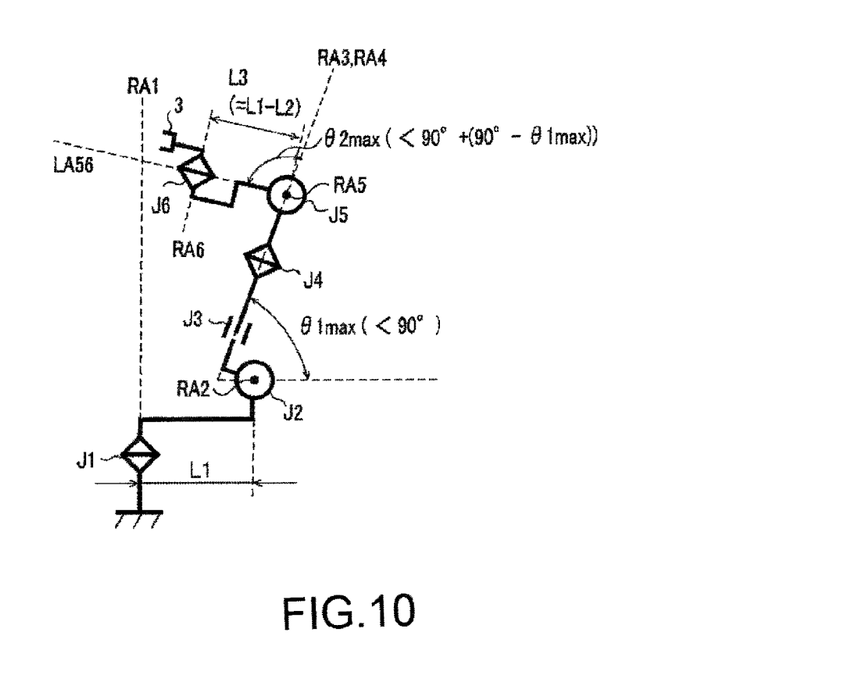
FIG. 10 is a diagram illustrating yet another example of the offset distances L1, L2 and L3 in FIGS. 8A and 8B.

Furthermore, under a specific condition exemplified in FIG. 10, a structure in which the distance L3 between the axis of rotation RA5 of bending joint J5 and the axis of rotation RA6 of bending joint J6 is equal to the difference (L1−L2) between offset distance L1 and offset distance L2 may be adopted. Of course, there is a structural rotation limit on the luffing angle (rotation angle) $\theta 1$ of bending joint J2.

The luffing angle (rotation angle) $\theta 1$ of bending joint J2 is an angle expressed by defining the angle of the time when the arm section 2 is in a horizontal posture, that is, the axis of movement RA3 of the linear motion joint J3 is horizontal, as zero degree, and defining angles above zero degree as plus angles and angles below zero degree as minus angles. The rotation angle $\theta 2$ of bending joint J5 is an angle expressed by defining the angle of the time when an axis between centers (link axis) LA56 between bending joint J5 and revolute joint J6 matches the axis of movement RA3 of the linear motion joint J3 as zero degree and defining angles above zero degree as plus angles and angles below zero degree as minus angles. In FIG. 10, the maximum luffing angle (maximum rotation angle) is expressed as $\theta 1$ max. There is also a structural rotation limit on the rotation angle $\theta 2$ of bending joint J5, and the maximum rotation angle thereof is expressed as $\theta 2$ max. In a posture in which revolute joint J4 is a reference angle, in other words, the axis of rotation RA5 of bending joint J5 is parallel to the axis of rotation RA2 of bending joint J2, under the condition where even the maximum rotation angle $\theta 1$ max of bending joint J2 and the maximum rotation angle $\theta 2$ max of bending joint J5 cannot make the link axis LA56 of bending joint J5 and revolute joint J6 horizontal, the axis of rotation RA6 of revolute joint J6 never becomes parallel to the axis of rotation RA1 of revolute joint J1, and the posture cannot be the singular point posture. Typically, the maximum rotation angle $\theta 1$ max of bending joint J2 is less than 90 degrees, and the maximum rotation angle $\theta 2$ max of bending joint J5 is less than $(90°+(90°−\theta 1 \text{ max}))$. Under this condition, in the robot arm mechanism according to the present embodiment, the distance L3 between the axis of rotation RA5 of bending joint J5 and the axis of rotation RA6 of revolute joint J6 may be equal to the difference (L1−L2) between offset distance L1 and offset distance L2.

Figure 13C:
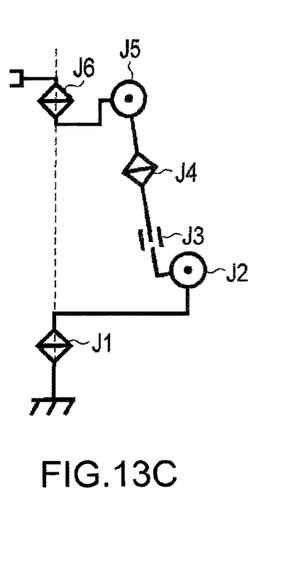

As shown in FIG. 13C, when bending joint J2 is rotated to an angle other than 90 degrees and bending joint J5 is further rotated so that the axis of rotation RA6 of revolute joint J6 becomes vertical from the alignment pose, the singular point posture in which the axis of rotation RA1 of revolute joint J1 and the axis of rotation RA6 of revolute joint J6 are aligned in a straight line can occur.

Figure 11:
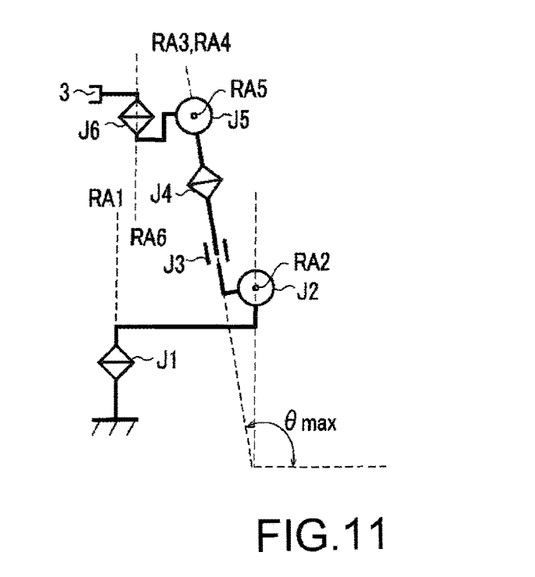
FIG. 11 is a diagram illustrating a structure by which the singular point is not generated according to the present embodiment.
Figure 12:
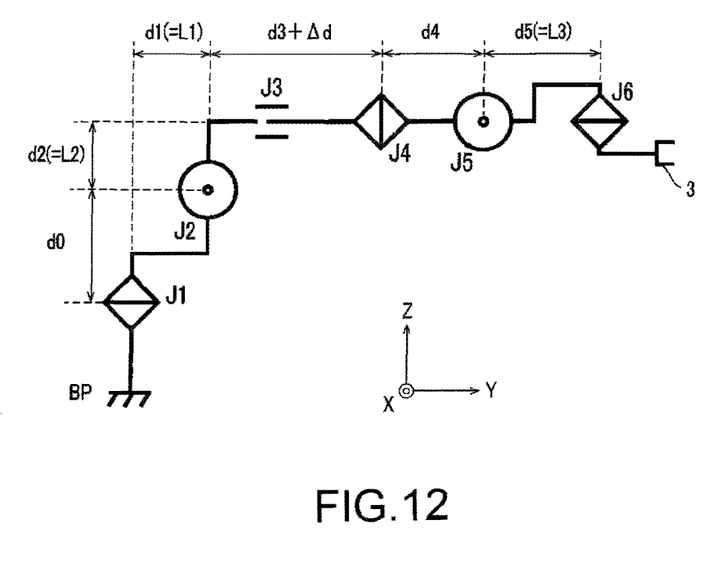
FIG. 12 is a diagram illustrating a link length of the robot arm mechanism according to the present embodiment.

In the present embodiment, as shown in FIG. 11, in order to prevent the singular point posture from occurring in structure, a combination of link lengths (distances between joint centers) d0-d5 is adjusted so that the axis of rotation RA6 of revolute joint J6 stops in the front of the axis of rotation RA1 of revolute joint J1 in a state in which bending joint J2 is rotated to the maximum luffing angle $\theta$max (in this case, over 90°) of the structure. As shown in FIG. 12, d0 is the link length between the first joint J1 and the second joint J2, d1 is the link length between the first joint J1 and the second joint J2, d2 is the link length between the second joint J2 and the third joint J3, d3+Δd (Δd is the maximum extension distance of the linear motion joint J3) is the link length between the second joint J2 and the fourth joint J4, d4 is the link length between the fourth joint J4 and the fifth joint J5, and d5 is the link length between the fifth joint J5 and the sixth joint J6.

According to the present embodiment, it is possible to eliminate or reduce occurrence of various singular point postures within the movable range by measures taken regarding the structure.

While certain embodiments of the present invention have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A robot arm mechanism including a plurality of joints, wherein
    the plurality of joints include a first joint, a second joint, a third joint, a fourth joint, a fifth joint and a sixth joint,
    the first joint is a rotational joint that rotates on a first axis,
    the second joint is a rotational joint that rotates on a second axis,
    the third joint is a linear motion joint that moves along a third axis,
    the second axis is perpendicular to the first axis and is a first distance away from the first axis, and
    the third axis is perpendicular to the second axis and is a second distance away from the second axis,
        the fourth joint is a rotational joint that rotates on a fourth axis that substantially matches the third axis,
        the fifth joint is a rotational joint that rotates on a fifth axis perpendicular to the fourth axis,
        the sixth joint is a rotational joint that rotates on a sixth axis perpendicular to the fourth axis and the fifth axis, and
    the first to sixth joints are arranged in order from the base,
        wherein the first distance is different from the second distance,
        wherein a distance between the fifth axis and the sixth axis is different from a difference between the first distance and the second distance, and
        wherein the robot arm mechanism prevents or eliminates singular point postures.

2. The robot arm mechanism according to claim 1, wherein the first distance is longer than the second distance.

3. The robot arm mechanism according to claim 1, wherein the first distance is shorter than the second distance.

4. The robot arm mechanism according to claim 1, wherein the second axis is away from the first axis in a direction perpendicular to the first axis and the second axis.

5. The robot arm mechanism according to claim 1, wherein the third axis is away from the second axis in a direction perpendicular to the second axis and the third axis.

6. The robot arm mechanism according to claim 1, wherein the distance between the fifth axis and the sixth axis is shorter than the difference between the first distance and the second distance.

7. The robot arm mechanism according to claim 1, wherein the distance between the fifth axis and the sixth axis is longer than the difference between the first distance and the second distance.

* * * * *